(12) United States Patent
Bourbeaux

(10) Patent No.: US 9,021,544 B1
(45) Date of Patent: Apr. 28, 2015

(54) PERSONAL IRRITATION DISPERSION DEVICE SYSTEMS

(71) Applicant: Louella Bourbeaux, Yermo, CA (US)

(72) Inventor: Louella Bourbeaux, Yermo, CA (US)

( * ) Notice: Subject to any disclaimer, the term of this patent is extended or adjusted under 35 U.S.C. 154(b) by 0 days.

(21) Appl. No.: 14/474,539

(22) Filed: Sep. 2, 2014

Related U.S. Application Data

(60) Provisional application No. 61/926,192, filed on Jan. 10, 2014.

(51) Int. Cl.
  *H04N 7/16* (2011.01)
  *H04N 21/258* (2011.01)
  *H04N 21/442* (2011.01)

(52) U.S. Cl.
  CPC ... *H04N 21/25891* (2013.01); *H04N 21/44222* (2013.01)

(58) Field of Classification Search
  CPC . H04N 21/42204; F41J 3/0071; F41J 3/0076; F41J 3/02; F41J 5/052; F41J 5/24; G06F 3/017; G06F 3/04842; G06F 3/0488; G06F 3/041
  USPC .......... 725/13, 133, 141, 153; 463/61, 31, 33; 273/358, 108.1–108.22
  See application file for complete search history.

(56) References Cited

U.S. PATENT DOCUMENTS

| | | | |
|---|---|---|---|
| 4,737,134 A | 4/1988 | Rumsey | |
| 5,288,069 A | 2/1994 | Matsumoto | |
| 5,951,015 A * | 9/1999 | Smith et al. | 273/358 |
| 6,251,011 B1 * | 6/2001 | Yamazaki | 463/2 |
| 8,726,548 B2 * | 5/2014 | Larson et al. | 40/124.08 |
| 2006/0183576 A1 | 8/2006 | Lindsey et al. | |
| 2008/0274809 A1 * | 11/2008 | Chang | 463/33 |
| 2009/0049470 A1 * | 2/2009 | Peer et al. | 725/38 |

* cited by examiner

*Primary Examiner* — Oleg Asanbayev
(74) *Attorney, Agent, or Firm* — RG Patent Consulting, LLC; Rachel Gilboy

(57) ABSTRACT

An apparatus for an electronic feedback system designed to work in combination with a television set to enable a viewer to express his or her anger toward televised events by allowing the viewer to vent his or her anger in a physical, satisfying manner, yet do no harm to the television set.

18 Claims, 5 Drawing Sheets

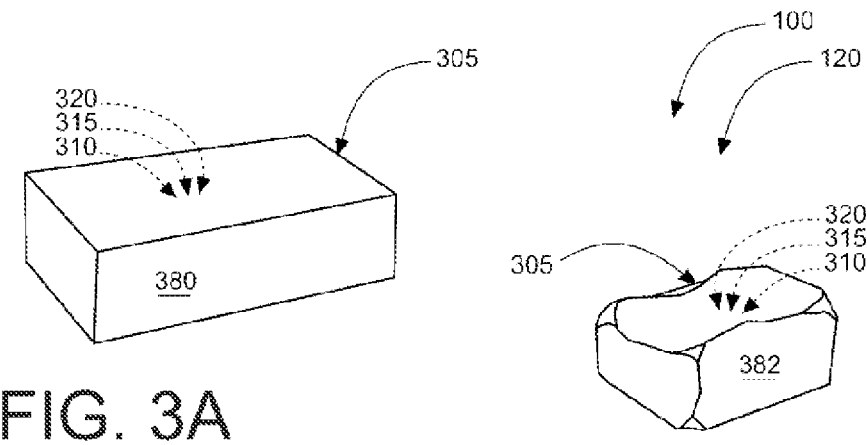
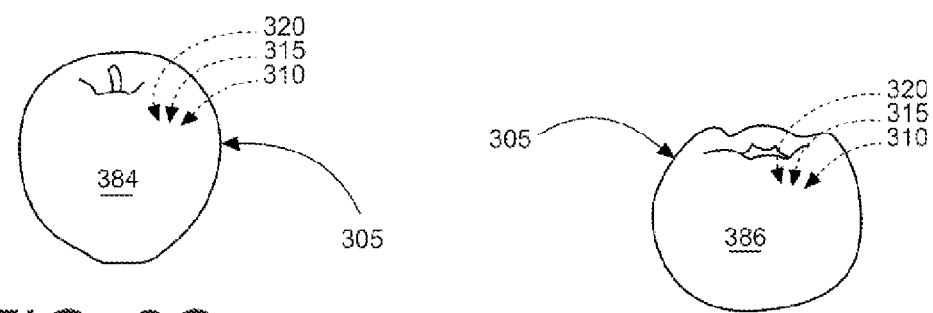
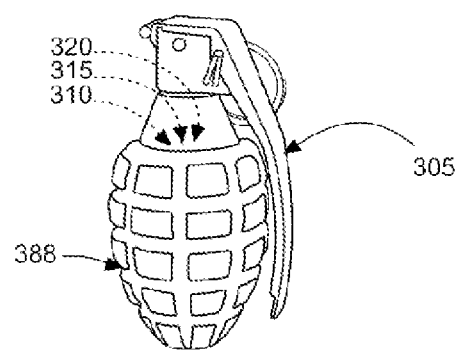
FIG. 3A
FIG. 3B
FIG. 3C
FIG. 3D
FIG. 3E ion as claimed.
PERSONAL IRRITATION DISPERSION DEVICE SYSTEMS

CROSS-REFERENCE TO RELATED APPLICATION

The present application is related to and claims priority from prior provisional application Ser. No. 61/926,192, filed Jan. 10, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of television accessories and more specifically relates to an electronic feedback system designed to work in conjunction with a television set to enable the viewer to express his or her anger toward televised events.

DESCRIPTION OF THE RELATED ART

America currently has a population of about 312 million, and that the average American watches more than four hours of TV each day. That averages about 28 hours per week, or 2 months of nonstop TV-watching per year. Most critics of modern society claim that watching television is an entirely passive activity, but this is not actually the case. Any die-hard sports fan will go berserk and shout at the TV if a call goes against his team. A liberal will go berserk if he or she has to watch Fox News, and a conservative will go berserk if he or she has to watch MSNBC. Such viewers are not passive, but may be simply enraged.

The problem is that they have no means, other than screaming at the TV, to express their anger. They could throw something at the TV, but breaking this appliance is not likely to relieve their anger. Such individuals have a need a satisfying, physical outlet for their anger yet not damaging the TV set. In a country where the average home includes two or more televisions, such a device would enable TV viewers to be active in their viewing, letting out their frustration and anger, while protecting these appliances from damage.

Various attempts have been made to solve the above-mentioned problems such as those found in U.S. Pub. No. 2006/0183576 to Michael K. Lindsey et al, U.S. Pat. No. 4,737,134 to Daniel L. Rumsey, and U.S. Pat. No. 5,288,069 to Susan Matsumoto. This art is representative of throwable novelty devices. None of the above inventions and patents, taken either singly or in combination, is seen to describe the invention as claimed.

Ideally, a personal irritation dispersion device assembly should enable a viewer to vent his or her anger toward televised events in a physical, satisfying manner, yet do no harm to the television and, yet would operate reliably and be manufactured at a modest expense. Thus, a need exists for a reliable P.I.D.D. Personal Irritation Dispersion Device, an electronic feedback system designed to work in conjunction with a television set to enable the viewer to express his or her anger toward televised events allowing a viewer to vent his or her anger in a physical, satisfying manner, yet do no harm to the television and to avoid the above-mentioned problems.

BRIEF SUMMARY OF THE INVENTION

In view of the foregoing disadvantages inherent in the known foam throwable novelty devices with electronic circuitry inside art, the present invention provides a novel P.I.D.D. Personal Irritation Dispersion Device. The general purpose of the present invention, which will be described subsequently in greater detail, is to provide an electronic feedback system designed to work in conjunction with a television set to enable the viewer to express his or her anger toward televised events allowing a viewer to vent his or her anger in a physical, satisfying manner, yet do no harm to the television.

A preferred embodiment of an electronic kinetic television feedback system is disclosed herein comprising a personal irritation dispersion device assembly for use with a television of a user. The personal irritation dispersion device assembly may comprise a plug-in RF receiver unit, at least one lightweight tossable emotion evincing object preferably fabricated of foam, and a wireless gun controller assembly comprising a wireless gun controller and a furniture-harness for storing the wireless gun controller during periods of non-use.

The plug-in RF receiver unit may comprise a housing, a microprocessor structured and arranged to process the plug-in RF receiver unit, a display sensor preferably comprising an optic laser sensor structured and arranged to detect a point of impact on a display screen of the television and transmit coordinates relating to the point of impact to the microprocessor, a wireless transmitter unit, a memory unit, and a power supplier.

The lightweight tossable emotion evincing object(s) fabricated of foam may comprise a tossable-object-housing, a microchip, a micro-transceiver synced with a unique identifier, and a micro-powerer for powering the lightweight tossable emotion evincing object. Gun embodiments may not be throwable. In such embodiments the wireless gun controller assembly may comprise a wireless gun controller in remote communication with the wireless transmitter unit of the plug-in RF receiver unit, and a furniture-holster for holstering the wireless gun controller during a period of non-use.

The electronic kinetic television feedback system comprises the personal irritation dispersion device assembly. The plug-in RF receiver unit and the lightweight tossable emotion evincing object comprises in functional combination the personal irritation dispersion device assembly.

The housing of the plug-in RF receiver unit comprises a hollow confine for securely retaining the microprocessor, the display sensor, the wireless transmitter unit, the memory unit, and the power supplier. The housing may further comprise at least one audio/visual port, a HDMI port, and a USB port. The microprocessor, the display sensor, the wireless transmitter unit, the memory unit, and the power supplier may be in communication via a plurality of circuitry cables. The microprocessor processes and transmits signals between the plug-in RF receiver unit and the television via a connector cable. The display sensor is in communication with a visual display screen processor of the television. The wireless transmitter unit is in wireless communication with the micro-transceiver synced with the unique identifier of the lightweight tossable emotion evincing object. The memory unit stores data relevant to method of operation of the electronic kinetic television feedback system, and the power supplier provides operating power to the plug-in RF receiver unit.

The microchip, the micro-transceiver synced with the unique identifier, and the micro-powerer may be securely retained inside the tossable-object-housing. The microchip provides processing power enabling the micro-transceiver to wirelessly communicate with the wireless transmitter unit of the plug-in RF receiver unit. The display sensor is structured and arranged to sense a point of impact on a display screen of the television by the lightweight tossable emotion evincing object thrown by the user. It should be appreciated that the plug-in RF receiver unit of the electronic kinetic television feedback system causes a user-gratifying effect to be displayed at the point of impact on the display screen of the television during television program when at least one lightweight tossable emotion evincing object is thrown by the user at the television.

The electronic kinetic television feedback system may comprise a kit. The kit described herein may comprise the personal irritation dispersion device assembly, the lightweight tossable emotion evincing object fabricated of foam, the wireless gun controller assembly, and a set of user instructions.

A method of using an electronic kinetic television feedback system in combination with a television of a user as disclosed herein may comprise the steps of: installing plug-in RF receiver unit to the television via connector cable; configuring the plug-in RF receiver unit via a control function; throwing a lightweight tossable emotion evincing object by a user at a display screen of the television while watching a television program; sensing a unique identifier associated with the lightweight tossable emotion evincing object via display sensor of the plug-in RF receiver unit; and displaying a user-gratifying effect on the display screen of the television at a point of impact of the lightweight tossable emotion evincing object thrown by the user.

The present invention holds significant improvements and serves as an electronic kinetic television feedback system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, electronic kinetic television feedback system, constructed and operative according to the teachings of the present invention.

FIG. 3A is a perspective view illustrating the lightweight tossable emotion evincing object having a tossable-object-housing comprising a brick according to an embodiment of the present invention.

FIG. 3B is a perspective view illustrating the lightweight tossable emotion evincing object having a tossable-object-housing comprising a rock according to an embodiment of the present invention.

FIG. 3C is a perspective view illustrating the lightweight tossable emotion evincing object having a tossable-object-housing comprising a fruit according to an embodiment of the present invention.

FIG. 3D is a perspective view illustrating the lightweight tossable emotion evincing object having a tossable-object-housing comprising a vegetable according to an embodiment of the present invention.

FIG. 3E is a perspective view illustrating the lightweight tossable emotion evincing object having a tossable-object-housing comprising a grenade according to an embodiment of the present invention.

The various embodiments of the present invention will hereinafter be described in conjunction with the appended drawings, wherein like designations denote like elements.

DETAILED DESCRIPTION

Figure 1A:
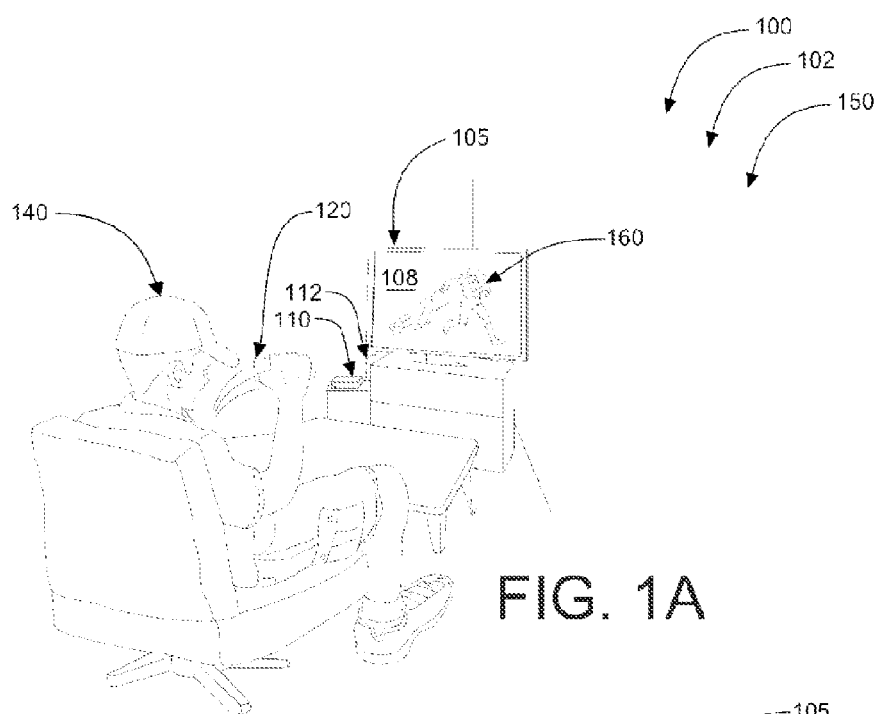
FIG. 1A shows a perspective view illustrating an electronic kinetic television feedback system during an 'in-use' condition showing a user throwing a lightweight tossable emotion evincing object at a display screen of a television according to an embodiment of the present invention.

As discussed above, embodiments of the present invention relate to a foam throwable novelty devices with electronic circuitry inside and more particularly to a P.I.D.D. Personal Irritation Dispersion Device, an electronic feedback system designed to work in conjunction with a television set to enable the viewer to express his or her anger toward televised events allowing a viewer to vent his or her anger in a physical, satisfying manner, yet do no harm to the television.

Generally speaking, the P.I.D.D. (Personal Irritation Dispersion Device) may equip any television with an electronic and kinetic feedback system comprising a system designed to enable the viewer to actively respond to the TV in a physical manner by throwing "objects" at the screen. The objects may range from "tomatoes" and "bricks" to "hand-grenades" and, in an alternative accessory, to "shoot" the TV with a plastic wireless handgun. When struck by the "objects" or shot by the "gun," the screen may display a smashed fruit, or a "shattered" screen, or a bullet-hole, all of which, like the "objects" and the "gun," are programmed, through embedded microchips and a microchip, to result in graphic images on the screen.

The primary functioning equipment of the P.I.D.D. system may comprise a plug-in RF receiver box designed to be plugged into a TV's audio/video input jack, or alternatively, a stick-type RF receiver resembling a flash-drive with a USB port connection plug. This receiver may be programmed to monitor and recognize the various, realistically molded sponge "objects" included in the system. The receiver may also monitor and recognize the "gun", which may comprise a plastic revolver that comprises an RF transmitter. When any of the "objects" are thrown successfully at the TV, the RF receiver may recognize the impact and a microprocessor may then cause to display, on the TV display screen, the appropriate image (such as smashed fruit, broken eggs, a shattered screen, or an exploded set).

These gratifying images may be displayed for whatever interval the user sets beforehand. Further, when the "gun" is fired at the set, the RF receiver may record a "hit" by displaying an on-screen bullet-hole. The RF receiver unit may be equipped with a power cord and plug. Alternative, if a stick-type USB "drive" is used, it may be powered by the TV itself.

Versatile, the P.I.D.D. system may also comprise objects that signify a happy response. For example, objects such as a sponge fist, which when thrown at the TV may display a fist bump graphic. Another example of use for other coordinating objects which may display images and actions such as a high five hand clap, chest bump, a cannon firing streamers in celebration, and others.

Furthermore, each of the throwable sponge or foam objects may be washable. The P.I.D.D. System, ideal for self-expression and release, may also be used for many other purposes including medical therapy, anger management, stress relief, skills training, and more, creating a very sizable market potential.

Figure 1B:
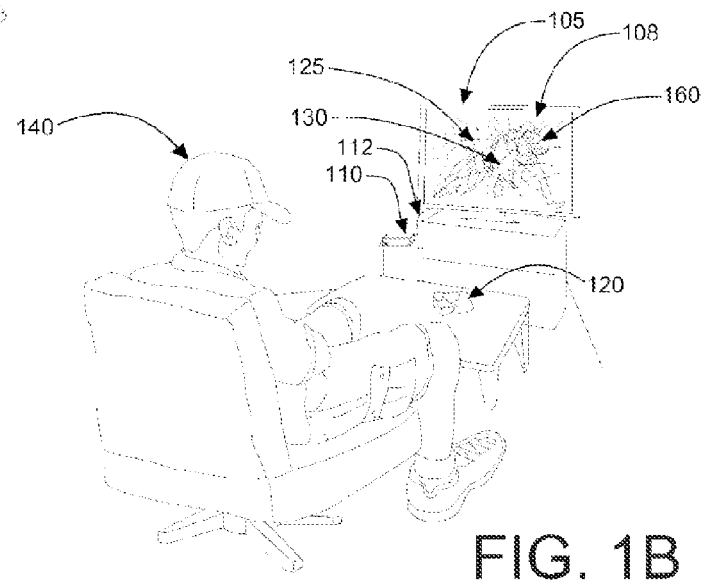
FIG. 1B is a perspective view illustrating the electronic kinetic television feedback system during the 'in-use' condition showing the display screen of the television depicting a shattered-screen illusion according to an embodiment of the present invention of FIG. 1A.

Referring now to the drawings by numerals of reference there is shown in FIGS. 1A and 1B, electronic kinetic television feedback system 100 during 'in-use' condition 150 showing user 140 throwing lightweight tossable emotion evincing object 120 at display screen 108 of television 105 according to an embodiment of the present invention. As shown, electronic kinetic television feedback system 100 may comprise personal irritation dispersion device assembly 102 for use with television 105 of user 140. Personal irritation dispersion device assembly 102 may comprise plug-in RF receiver unit 110 and lightweight tossable emotion evincing object(s) 120 operating in functional combination. As shown, plug-in RF receiver unit 110 may plug into television 105 via connector cable 112 of personal irritation dispersion device assembly 102.

In continuing to refer to FIG. 1A, lightweight tossable emotion evincing object(s) 120 comprises tossable-object-housing 305, microchip 310, micro-transceiver 315 synced with unique identifier 316, and micro-powerer 320 for powering lightweight tossable emotion evincing object 120. Plug-in RF receiver unit 110 and lightweight tossable emotion evincing object(s) 120 may comprise in functional combination personal irritation dispersion device assembly 102.

In continuing to refer to FIG. 1A, user 140 is shown watching television program 160 on display screen 108 of television 105. User 140 is shown holding lightweight tossable emotion evincing object 120 in a throwing-position in order to toss lightweight tossable emotion evincing object 120 at display screen 108.

Referring now to FIG. 1B showing a perspective view illustrating electronic kinetic television feedback system 100 during 'in-use' condition 150 showing display screen 108 of television 105 depicting a shattered-screen illusion according to an embodiment of the present invention of FIG. 1A. As shown, user 140 has thrown lightweight tossable emotion evincing object 120 at display screen 108 of television 105 thus producing user-gratifying effect 125 displayable on display screen 108 of television 105 at point of impact 130 of lightweight tossable emotion evincing object 120.

In the embodiment of the present invention as shown in FIGS. 1A and 1B, lightweight tossable emotion evincing object 120 may comprise tossable-object-housing 305 comprising brick 380. In such embodiment, user-gratifying effect 125 may comprise a shattered-screen illusion centered at point of impact 130. It should be noted that lightweight tossable emotion evincing object(s) 120 are preferably fabricated of foam or a foam-like material such that display screen 108 of television 105 is not damaged. Alternatively, lightweight tossable emotion evincing object(s) 120 may comprise a sponge-like material.

In still referring to FIGS. 1A and 1B, plug-in RF receiver unit 110 comprising display sensor 215 may be structured and arranged to sense point of impact 130 on display screen 108 of television 105 caused by lightweight tossable emotion evincing object 120 thrown by user 140. In response to detection of point of impact 130, microprocessor 210 of plug-in RF receiver unit 110 may cause user-gratifying effect 125 to be displayed at point of impact 130 on display screen 108 of television 105 during television program 160.

Figure 2:
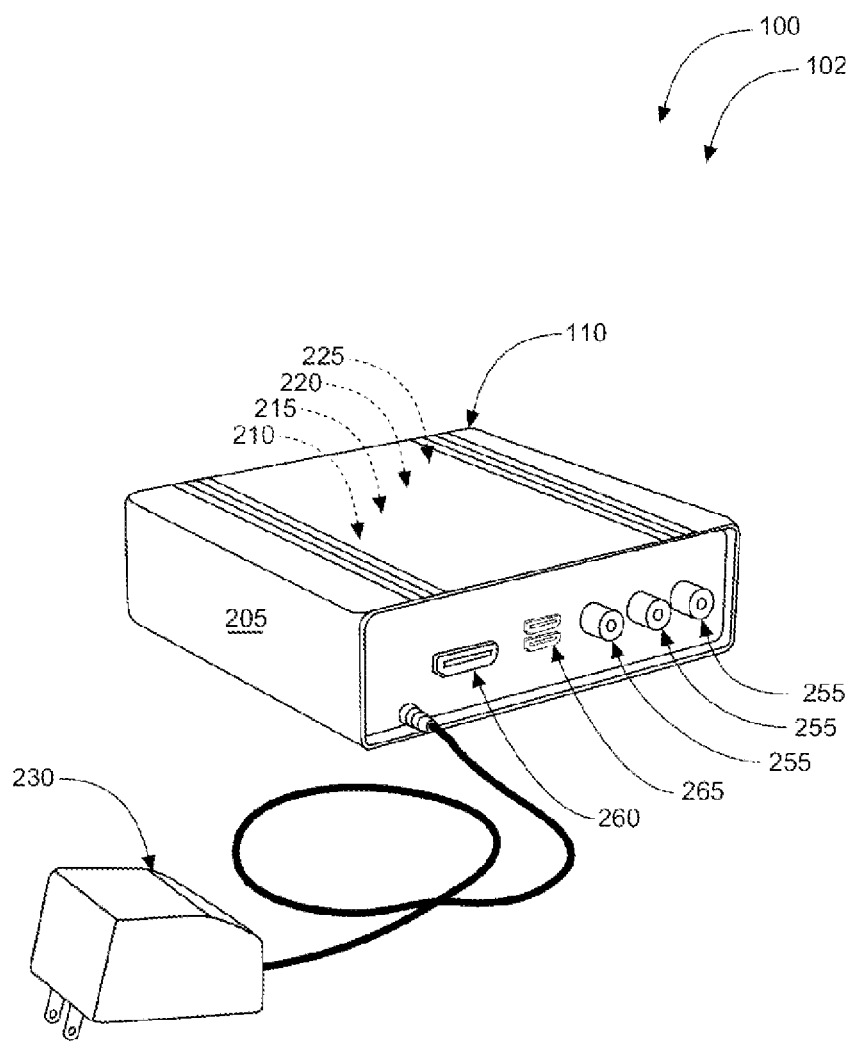
FIG. 2 is a perspective view illustrating a plug-in RF receiver unit of a personal irritation dispersion device assembly according to an embodiment of the present invention of FIGS. 1A and 1B.

Referring now to FIG. 2 is a perspective view illustrating plug-in RF receiver unit 110 of personal irritation dispersion device assembly 102 according to an embodiment of the present invention of FIGS. 1A and 1B. As shown, plug-in RF receiver unit 110 may comprise housing 205, microprocessor 210 structured and arranged to process plug-in RF receiver unit 110, display sensor 215, wireless transmitter unit 220, memory unit 225, and power supplier 230.

In continuing to refer to FIG. 2, housing 205 of plug-in RF receiver unit 110 may comprise a hollow confine for securely retaining microprocessor 210, display sensor 215, wireless transmitter unit 220, memory unit 225, and power supplier 230. Microprocessor 210, display sensor 215, wireless transmitter unit 220, memory unit 225, and power supplier 230 may be in communication via a plurality of circuitry cables.

In continuing to refer to FIG. 2, microprocessor 210 of personal irritation dispersion device assembly 102 may process and transmit signals between plug-in RF receiver unit 110 and television 105 via connector cable 112 during 'in-use' condition 150 of electronic kinetic television feedback system 100. Display sensor 215 may be in direct communication with a visual display screen processor of television 105. Furthermore, wireless transmitter unit 220 may be in wireless communication with micro-transceiver 315. It should be noted that micro-transceiver 315 may be synced with unique identifier 316 corresponding to a particular type of lightweight tossable emotion evincing object 120. In addition, memory unit 225 may store data relevant to a method of operation of electronic kinetic television feedback system 100. Power supplier 230 may provide operating power to plug-in RF receiver unit 110. As shown in FIG. 2, power supplier 230 may comprise a power plug. In alternative embodiments, power supplier 230 may comprise at least one battery.

In continuing to refer to FIG. 2, housing 205 of plug-in RF receiver unit 110 may comprise audio/visual port(s) 255 for enabling at least one audio/visual cable to be connected to television 105. Housing 205 of plug-in RF receiver unit 110 may further comprise HDMI port 260 useful for receiving a HDMI cable for display screen 108 of television 105 comprising high definition. Housing 205 of plug-in RF receiver unit 110 may further comprise USB port 265 for receiving memory unit 225 comprising a removable USB thumb drive or flash drive. It should be appreciated that USB port 265 may further receive any USB cable which may be connected to a mobile communication device (computer, smartphone, etc.). It should further be noted that the USB thumb drive or flash drive may store data relevant to a method of operation of electronic kinetic television feedback system 100.

In continuing to refer to FIG. 2, display sensor 215 of plug-in RF receiver unit 110 may preferably comprise an optic laser sensor. The optic laser sensor may be structured and arranged to detect point of impact 130 on display screen 108 of television 105 and, in turn, transmit coordinates relating to point of impact 130 to microprocessor 210. Microprocessor 210, in turn, may cause user-gratifying effect 125 corresponding to unique identifier 316 of lightweight tossable emotion evincing object 120 to display on display screen 108 of television 105.

Referring now to FIGS. 3A-3E showing perspective views of lightweight tossable emotion evincing object(s) 120 of electronic kinetic television feedback system 100 comprising a multitude of common objects which user 140 may desire to throw at television 105 for evincing emotions such as anger, frustration, or outrage based upon television program 160 being watched by user 140. As shown, lightweight tossable emotion evincing object(s) 120 may each individually comprise tossable-object-housing 305, microchip 310, microtransceiver 315 synched with unique identifier 316, and micro-powerer 320. It should be appreciated that tossable-object-housing 305 may be manufactured in various forms representing common objects user 140 may desire to throw.

In continuing to refer to FIGS. 3A-3E, microchip 310, micro-transceiver 315 synced with unique identifier 316 and micro-powerer 320 may be securely retained inside tossable-object-housing 305. Microchip 310 may provide processing power enabling micro-transceiver 315 to wirelessly communicate with wireless transmitter unit 220 of plug-in RF receiver unit 110.

With particular reference to unique identifier 316 of lightweight tossable emotion evincing object 120, unique identifier 316 may be synced with particular tossable-object-housing 305 and may be transmitted by micro-transceiver 315 for detection by wireless transmitter unit 220 of plug-in RF receiver unit 110 upon an impact of lightweight tossable emotion evincing object 120 as detected by display sensor 215. A length of time of user-gratifying effect 125 to be displayed at point of impact 130 on display screen 108 may be configurable by user 140 via a control function available to user 140 on plug-in RF receiver unit 110. Alternatively, the control function may be configured via a remote control unit.

Referring now to FIG. 3A showing a perspective view illustrating lightweight tossable emotion evincing object 120 having tossable-object-housing 305 comprising brick 380 according to an embodiment of the present invention. For novelty purposes, tossable-object-housing 305 comprising brick 380 may comprise unique identifier 316 creating user-gratifying effect 125 comprising a shattered-screen illusion at point of impact 130 when brick 380 is thrown at display screen 108 of television 105 by user 140.

Referring now to FIG. 3B showing a perspective view illustrating lightweight tossable emotion evincing object 120 having tossable-object-housing 305 comprising rock 382 according to an embodiment of the present invention. For novelty purposes, tossable-object-housing 305 comprising rock 382 may comprise unique identifier 316 creating user-gratifying effect 125 comprising the shattered-screen illusion at point of impact 130 when rock 382 is thrown at display screen 108 of television 105 by user 140.

Referring now to FIG. 3C showing a perspective view illustrating lightweight tossable emotion evincing object 120 having tossable-object-housing 305 comprising fruit 384 according to an embodiment of the present invention. For novelty purposes, tossable-object-housing 305 comprising fruit 384 may comprise unique identifier 316 creating user-gratifying effect 125 comprising a splattered-screen illusion at point of impact 130 when fruit 384 is thrown at display screen 108 of television 105 by user 140.

Referring now to FIG. 3D showing a perspective view illustrating lightweight tossable emotion evincing object 120 having tossable-object-housing 305 comprising vegetable 386 according to an embodiment of the present invention. For novelty purposes, tossable-object-housing 305 comprising vegetable 386 may comprise unique identifier 316 creating user-gratifying effect 125 comprising the splattered-screen illusion at point of impact 130 when vegetable 386 is thrown at display screen 108 of television 105 by user 140.

Referring now to FIG. 3E showing a perspective view illustrating the lightweight tossable emotion evincing object 120 having tossable-object-housing 305 comprising grenade 388 according to an embodiment of the present invention. For novelty purposes, tossable-object-housing 305 comprising grenade 388 may comprise unique identifier 316 creating user-gratifying effect 125 comprising an exploded-screen illusion at point of impact 130 when grenade 388 is thrown at display screen 108 of television 105 by user 140.

Although not shown, tossable-object-housing 305 of lightweight tossable emotion evincing object 120 may comprise an egg and whereby unique identifier 316 of the egg may create user-gratifying effect 125 comprising a cracked-egg-screen illusion to display on display screen 108 of television 105 at point of impact 130.

It should be noted that in alternative embodiments of electronic kinetic television feedback system 100, tossable-object-housing 305 of lightweight tossable emotion evincing object 120 may comprise a sponge fist and alternatively a high-five. In such embodiments, unique identifier 316 of the sponge fist and alternatively the high-five may comprise user-gratifying effect 125 comprising a sign of approval indicium to display on display screen 108 of television 105. Another example of use for other coordinating objects which may display images and actions such as a high five hand clap, chest bump, a cannon firing streamers in celebration, and others.

Figure 4A:
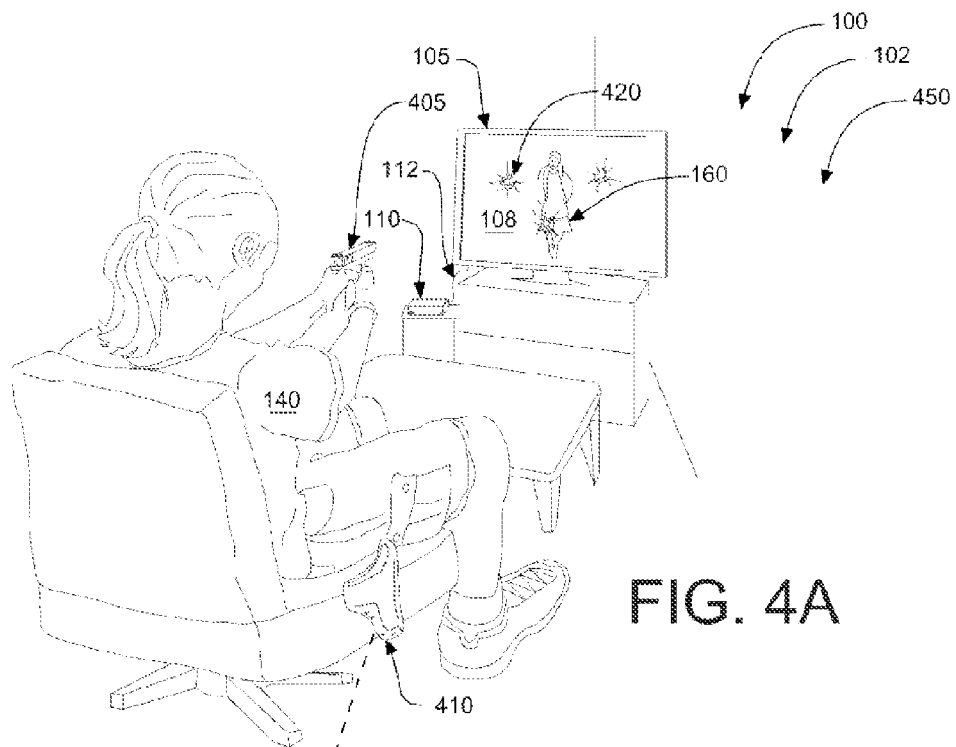
FIG. 4A is a perspective view illustrating the electronic kinetic television feedback system during an 'in-use' condition comprising a wireless gun controller which may be aimed and fired at the display screen of the television according to an embodiment of the present invention.

Referring now to FIG. 4A showing a perspective view illustrating electronic kinetic television feedback system 100 during 'in-use' condition 450 comprising wireless gun controller 405 which may be aimed and fired at display screen 108 of television 105 according to an embodiment of the present invention. As shown, wireless gun controller 405 may be in remote communication with wireless transmitter unit 220 of plug-in RF receiver unit 110.

Figure 4B:
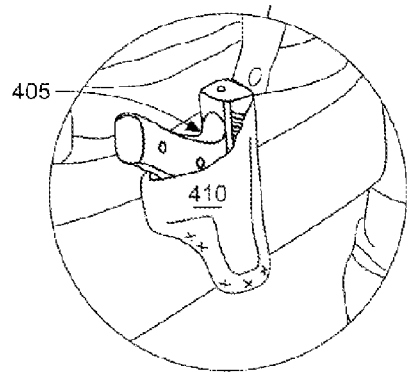
FIG. 4B is a perspective view illustrating the wireless gun controller tucked inside a furniture-holster according to an embodiment of the present invention.

Referring now to FIG. 4B showing a perspective view illustrating wireless gun controller 405 further comprising furniture-holster 410 according to an embodiment of the present invention. Furniture-holster 410 may comprise a holstering device for wireless gun controller 405 which may be mounted to a side of a couch, chair, loveseat, or other furniture. As shown in FIG. 4B, wireless gun controller 405 may be tucked inside furniture-holster 410 during a period of non-use.

Figure 4C:
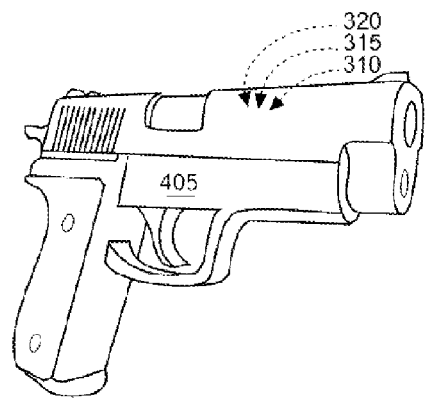
FIG. 4C is a perspective view illustrating the wireless gun controller according to an embodiment of the present invention.

Referring now to FIG. 4C showing a perspective view illustrating wireless gun controller 405 according to an embodiment of the present invention. As shown, wireless gun controller 405 may comprise microchip 310, micro-transceiver 315, and micro-powerer 320 for powering microchip 310 and micro-transceiver 315. Wireless gun controller 405 may be in a shape of a handgun. Alternatively, wireless gun controller 405 may comprise other firearms such as a shotgun, rifle, pistol, or semi-automatic weapon.

In referring specifically to FIG. 4A, user-gratifying effect 125 to be displayed when wireless gun controller 405 is fired by user 140 at display screen 108 of television 105 may be bullet hole illusion 420 at point of impact 130. It should be appreciated for sake of novelty point of impact 130 may be detected by display sensor 215 comprising the optic laser sensor according to a preferred embodiment of the present invention.

Electronic kinetic television feedback system 100 may be sold as a kit comprising the following parts: personal irritation dispersion device assembly 102, lightweight tossable emotion evincing object(s) 120, a wireless gun controller assembly comprising wireless gun controller 405 and furniture-holster 410, and other embodiments disclosed herein, and a set of user instructions. The kit has instructions such that functional relationships are detailed in relation to the structure of the invention (such that the invention can be used, maintained, or the like in a preferred manner). Electronic kinetic television feedback system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
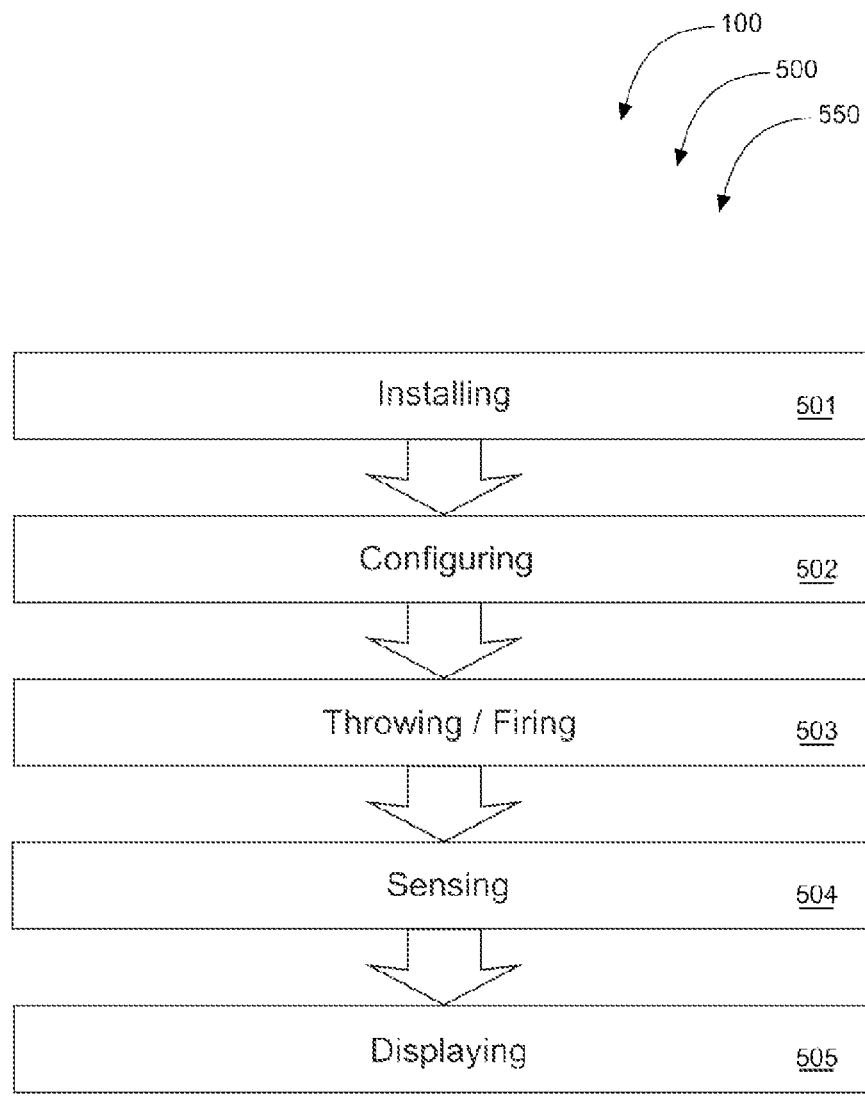
FIG. 5 is a flowchart illustrating a method of use for the electronic kinetic television feedback system according to an embodiment of the present invention of FIGS. 1A-4C.

Referring now to FIG. 5 showing flowchart 550 illustrating method of use 500 for electronic kinetic television feedback system 100 according to an embodiment of the present invention of FIGS. 1A-4C.

As shown, method of use 500 may comprise the steps of: step one 501, installing plug-in RF receiver unit 110 to television 105 via connector cable 112; step two 502, configuring plug-in RF receiver unit 110 via a control function; step three 503, throwing lightweight tossable emotion evincing object (s) 120 by user 140 at display screen 108 of television 105 while watching television program 160 and alternatively firing wireless gun controller 405 at display screen 108 of television 105; step four 504, sensing unique identifier 316 associated with lightweight tossable emotion evincing object 120 via display sensor 215 of plug-in RF receiver unit 110; and step five 505, displaying user-gratifying effect 125 on display screen 108 of television 105 at point of impact 130 of lightweight tossable emotion evincing object 120 thrown by user 140. Sounds and/or visual effects may differ.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An electronic kinetic television feedback system comprising:
    a personal irritation dispersion device assembly for use with a television of a user comprising;
        at least one plug-in RF receiver unit comprising;
        a housing;
        at least one microprocessor structured and arranged to process said at least one plug-in RF receiver unit;
        at least one display sensor;
        at least one wireless transmitter unit;
        at least one memory unit; and
        at least one power supplier; and
        at least one lightweight tossable emotion evincing object, said at least one lightweight tossable emotion evincing objects fabricated from foam comprising;
        a tossable-object-housing;
        a microchip;
        a micro-transceiver synced with a unique identifier; and
        a micro-powerer for powering said at least one lightweight tossable emotion evincing object;
    wherein said electronic kinetic television feedback system comprises said personal irritation dispersion device assembly;
    wherein said at least one plug-in RF receiver unit and said at least one lightweight tossable emotion evincing object comprise in functional combination said personal irritation dispersion device assembly;
    wherein said housing of said at least one plug-in RF receiver unit comprises a hollow confine for securely retaining said at least one microprocessor, said at least one display sensor, said at least one wireless transmitter unit, said at least one memory unit, and said at least one power supplier;
    wherein said at least one microprocessor, said at least one display sensor, said at least one wireless transmitter unit, said at least one memory unit, and said at least one power supplier are in communication via a plurality of circuitry cables; wherein said at least one microprocessor processes and transmits signals between said at least one plug-in RF receiver unit and said television via at least one connector cable;
    wherein said at least one display sensor is in communication with a visual display screen processor of said television;
    wherein said at least one wireless transmitter unit is in wireless communication with said micro-transceiver synced with said unique identifier of said at least one lightweight tossable emotion evincing object;

wherein said at least one memory unit stores data relevant to at least one method of operation of said electronic kinetic television feedback system;

wherein said at least one power supplier provides operating power to said at least one plug-in RF receiver unit;

wherein said microchip, said micro-transceiver synced with said unique identifier, and said micro-powerer are securely retained inside said tossable-object-housing;

wherein said microchip provides processing power enabling said micro-transceiver to wirelessly communicate with said at least one wireless transmitter unit of said at least one plug-in RF receiver unit;

wherein said at least one display sensor is structured and arranged to sense a point of impact on a display screen of said television by said at least one lightweight tossable emotion evincing object thrown by said user; and wherein said at least one plug-in RF receiver unit of said electronic kinetic television feedback system causes a user-gratifying effect to be displayed at said point of impact on said display screen of said television during at least one television program.

2. The electronic kinetic television feedback system of claim 1 wherein said housing of said at least one plug-in RF receiver unit comprises at least one audio/visual port.

3. The electronic kinetic television feedback system of claim 2 wherein said housing of said at least one plug-in RF receiver unit comprises at least one HDMI port.

4. The electronic kinetic television feedback system of claim 3 wherein said housing of said at least one plug-in RF receiver unit comprises at least one USB port.

5. The electronic kinetic television feedback system of claim 4 wherein said at least one memory unit comprises a USB thumb drive, said USB thumb drive storing said data relevant to said at least one method of operation of said electronic kinetic television feedback system.

6. The electronic kinetic television feedback system of claim 5 wherein said at least one display sensor of said at least one plug-in RF receiver unit comprises an optic laser sensor structured and arranged to detect a point of impact on said display screen of said television and transmit coordinates relating to said point of impact to said at least one microprocessor.

7. The electronic kinetic television feedback system of claim 6 wherein said unique identifier of said at least one lightweight tossable emotion evincing object is synced and a transmitted by said micro-transceiver and detectable by said at least one wireless transmitter unit of said at least one plug-in RF receiver unit upon said point of impact.

8. The electronic kinetic television feedback system of claim 7 wherein a length of time of said user-gratifying effect is to be displayed at said point of impact on said display screen is able to be configured by said user via a control function available to said user on said at least one plug-in RF receiver unit.

9. The electronic kinetic television feedback system of claim 8 wherein said electronic kinetic television feedback system further comprises a wireless gun controller in remote communication with said at least one wireless transmitter unit of said at least one plug-in RF receiver unit.

10. The electronic kinetic television feedback system of claim 9 wherein said electronic kinetic television feedback system further comprises a furniture-holster for holstering said wireless gun controller during a period of non-use.

11. The electronic kinetic television feedback system of claim 10 wherein said user-gratifying effect to be displayed is a bullet hole illusion at said point of impact as detected by a location where said user aims and fires at said display screen of said television as detected by said at least one display sensor comprising said optic laser sensor.

12. The electronic kinetic television feedback system of claim 11 wherein said tossable-object-housing of said at least one lightweight tossable emotion evincing object comprises a brick and alternatively a rock and whereby said unique identifier of said brick and alternatively said rock causes said user-gratifying effect to display a shattered-screen illusion on said display screen of said television at said point of impact.

13. The electronic kinetic television feedback system of claim 11 wherein said tossable-object-housing of said at least one lightweight tossable emotion evincing object comprises a fruit and alternatively a vegetable and whereby said unique identifier of said fruit and alternatively said vegetable causes said user-gratifying effect to display a splattered-screen illusion on said display screen of said television at said point of impact.

14. The electronic kinetic television feedback system of claim 12 wherein said tossable-object-housing of said at least one lightweight tossable emotion evincing object comprises an egg and whereby said unique identifier of said egg causes said user-gratifying effect to display a cracked-egg-screen illusion on said display screen of said television at said point of impact.

15. The electronic kinetic television feedback system of claim 12 wherein said tossable-object-housing of said at least one lightweight tossable emotion evincing object comprises a grenade and whereby said unique identifier of said grenade causes said user-gratifying effect to display an exploded-screen illusion at said point of impact.

16. The electronic kinetic television feedback system of claim 12 wherein said tossable-object-housing of said at least one lightweight tossable emotion evincing object comprises a sponge fist and alternatively a high-five and whereby said unique identifier of said sponge fist and alternatively said high-five causes said user-gratifying effect to display a sign of approval indicium.

17. An electronic kinetic television feedback system comprising:
a personal irritation dispersion device assembly for use with a television of a user comprising;
at least one plug-in RF receiver unit comprising;
a housing, said housing comprising at least one audio/visual port, said housing comprising at least one HDMI port, said housing comprising at least one USB port;
at least one microprocessor structured and arranged to process said at least one plug-in RF receiver unit;
at least one display sensor, said at least one display sensor comprising an optic laser sensor, said optic laser sensor structured and arranged to detect a point of impact on a display screen of said television and transmit coordinates relating to said point of impact to said at least one microprocessor;
at least one wireless transmitter unit;
at least one memory unit; and
at least one power supplier;
at least one lightweight tossable emotion evincing object fabricated of foam comprising:
a tossable-object-housing;
a microchip;
a micro-transceiver synced with a unique identifier; and
a micro-powerer for powering said at least one lightweight tossable emotion evincing object; and a wireless gun controller comprising;
  a wireless gun controller in remote communication with said at least one wireless transmitter unit of said at least one plug-in RF receiver unit; and
  a furniture-holster for holstering said wireless gun controller during a period of non-use;
wherein said electronic kinetic television feedback system comprises said personal irritation dispersion device assembly;
wherein said at least one plug-in RF receiver unit and said at least one lightweight tossable emotion evincing object comprise in functional combination said personal irritation dispersion device assembly;
wherein said housing of said at least one plug-in RF receiver unit comprises a hollow confine for securely retaining said at least one microprocessor, said at least one display sensor, said at least one wireless transmitter unit, said at least one memory unit, and said at least one power supplier;
wherein said at least one microprocessor, said at least one display sensor, said at least one wireless transmitter unit, said at least one memory unit, and said at least one power supplier are in communication via a plurality of circuitry cables;
wherein said at least one microprocessor processes and transmits signals between said at least one plug-in RF receiver unit and said television via at least one connector cable; wherein said at least one display sensor is in communication with a visual display screen processor of said television;
wherein said at least one wireless transmitter unit is in wireless communication with said micro-transceiver synced with said unique identifier of said at least one lightweight tossable emotion evincing object;
wherein said at least one memory unit stores data relevant to at least one method of operation of said electronic kinetic television feedback system;
wherein said at least one power supplier provides operating power to said at least one plug-in RF receiver unit;
wherein said microchip, said micro-transceiver synced with said unique identifier, and said micro-powerer are securely retained inside said tossable-object-housing;
wherein said microchip provides processing power enabling said micro-transceiver to wirelessly communicate with said at least one wireless transmitter unit of said at least one plug-in RF receiver unit;
wherein said at least one display sensor is structured and arranged to sense a point of impact on a display screen of said television by said at least one lightweight tossable emotion evincing object thrown by said user; and
wherein said at least one plug-in RF receiver unit of said electronic kinetic television feedback system causes a user-gratifying effect to be displayed at said point of impact on said display screen of said television during at least one television program.

18. The electronic kinetic television feedback system of claim 17 further comprising a kit including: said personal irritation dispersion device assembly; said at least one lightweight tossable emotion evincing object fabricated of foam; said wireless gun controller assembly; and a set of user instructions.

* * * * *